May 14, 1963 P. E. DAVIS 3,089,264
TRIP MECHANISM FOR ROTARY MULTIPLE BLADE SCRAPER
Filed April 20, 1961 2 Sheets-Sheet 1
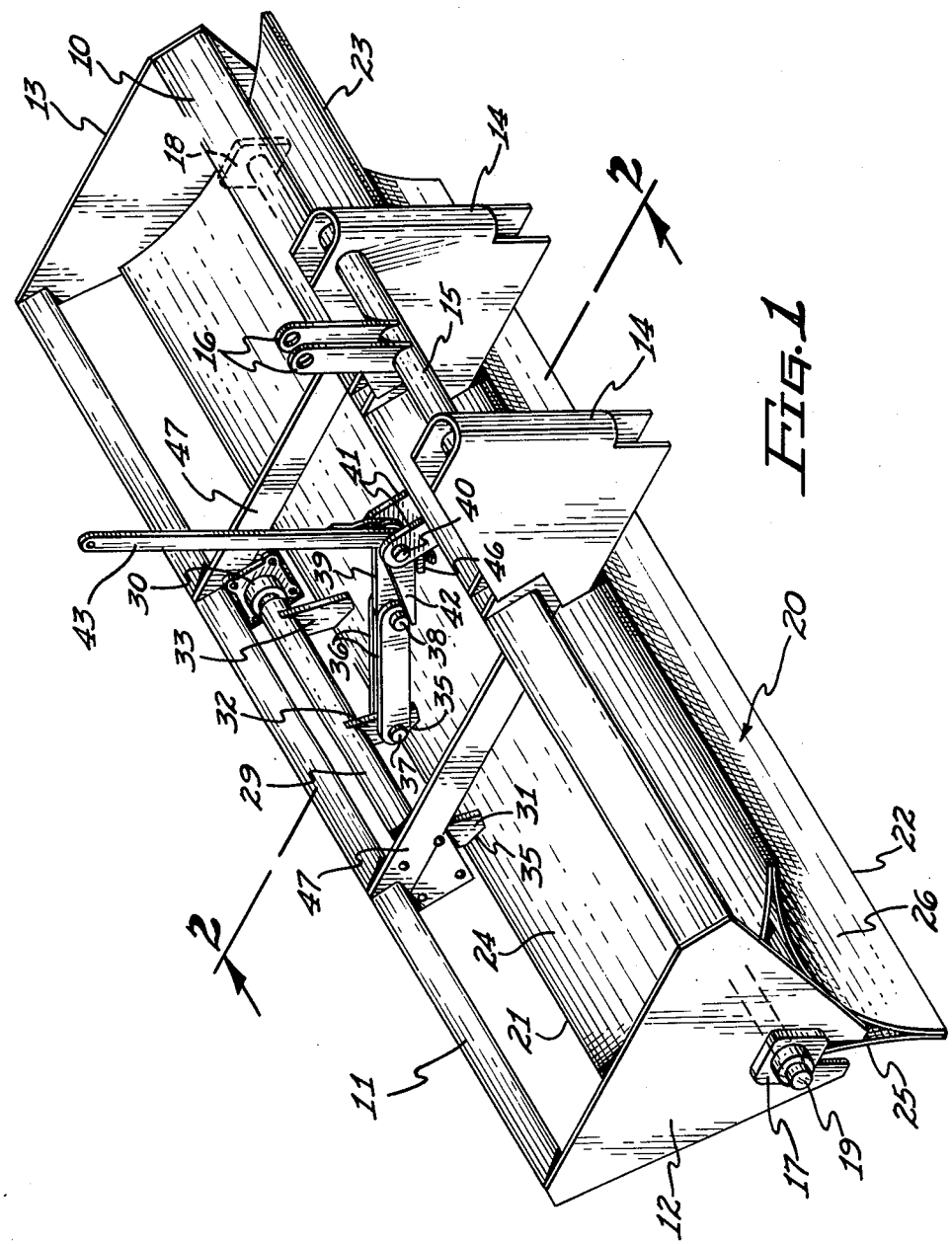
INVENTOR.
PHIL E. DAVIS
BY
ATTORNEY.

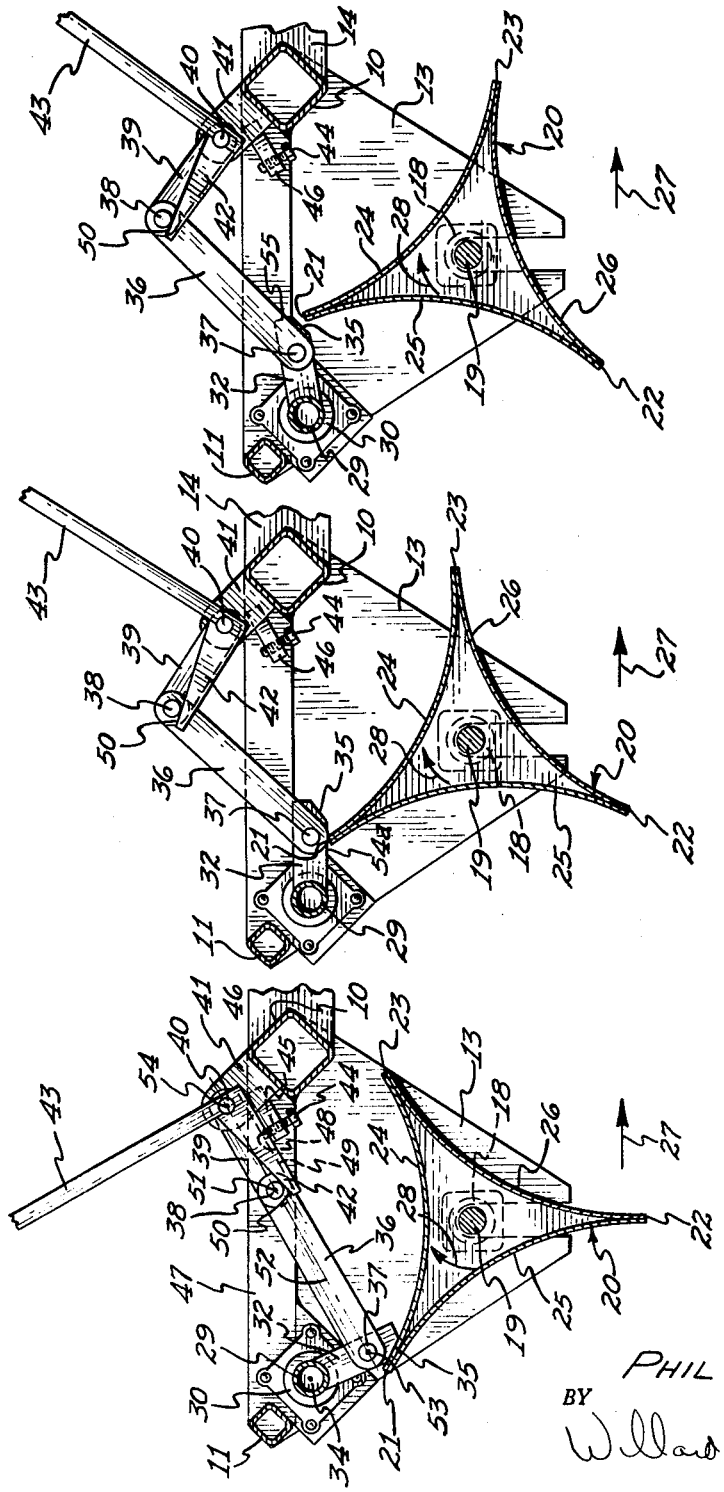

United States Patent Office 3,089,264
Patented May 14, 1963

3,089,264
TRIP MECHANISM FOR ROTARY MULTIPLE
BLADE SCRAPER
Phil E. Davis, Mesa, Ariz.; Wallace Perry, trustee of said
Phil E. Davis, bankrupt, assignor, by mesne assignments, to Sperry Rand Corporation, a corporation of Delaware
Filed Apr. 20, 1961, Ser. No. 104,334
2 Claims. (Cl. 37—143)

This invention pertains to improvements in trip mechanism for rotary multiple blade scrapers and is directed particularly to an improved trip linkage for such scrapers.

One of the objects of this invention is to provide a trip mechanism for a multi-edged rotary scraper blade which is self-locking and which automatically returns to locked position of the rotor after a new scraping blade edge is rotated into position.

Another object of this invention is to provide a trip and locking mechanism for circumferentially intermittently positioning the rotary blade of a rotary multiple blade scraper.

Further features and advantages of this invention will appear from a detailed description of the drawings in FIG. 1 is a perspective view of a rotary multiple blade scraper incorporating the features of this invention.

FIG. 2 is an enlarged transverse section on the line 2—2 of FIG. 1, showing the trip mechanism in locked position of the rotary scraper blade.

FIG. 3 is an enlarged transverse section similar to FIG. 2 but showing the trip mechanism in initial releasing position.

FIG. 4 is an enlarged transverse section similar to FIG. 2 but showing the trip mechanism fully released for free rotation of the rotary scraper blade.

As an example of one embodiment of this invention, there is shown a rotary multiple blade scraper comprising a frame consisting of the front tie bar 10 and the rear tie bar 11 to the ends of which are fixed the end plates 12 and 13. Suitable brackets 14 are fixed to the tie bar 10 and support a pivot shaft 15 appropriately journaled to the frame of a tractor and having an integral arm 16 connected to the usual raising and lowering mechanism of the tractor (not shown).

Journaled in suitable bearings 17 and 18 is the blade shaft 19 to which is fixed the blade rotor 20 having a plurality of scraper blades 21, 22 and 23 interconnected by concave moldboard portions 24, 25 and 26. By this arrangement, with the tractor and unit moving over the ground surface in the direction indicated by the arrow 27, FIG. 2, material scraped by the blade 22 piles up in front of the moldboard 26 causes the blade rotor 20 to revolve in the direction indicated by the arrow 28.

In order to intermittently arrest the rotation 28 of the rotor and to release said rotor so as to bring various blades 21, 22 and 23 to scraping position while leaving scraped up berms on the ground each time the rotor 20 is tripped and released, there is provided a trip mechanism comprising a rock shaft 29 journaled in suitable bearings 30. A plurality of axially spaced blade stops 31, 32 and 33 are fixed to the rockshaft 29 and extend radially outwardly of the axis 34 of the rockshaft and have abutment surfaces 35 adapted to engage the moldboard surfaces 24, 25 and 26 adjacent the respective scraper blades 21, 22 and 23.

An over center toggle lock and trip mechanism is provided to hold said blade stops in stop position, shown in FIG. 2, comprising the links 36 pivotally connected by a pin 37 to the intermediate blade stop 32, the links 36 in turn being pivotally connected at their other ends by a pin 38 to the outer end of the actuating link 39 which in turn is journaled at its other end about actuating pin 40 journaled in suitable brackets 41 fixed to the front tie bar 10. Adjustment blocks 42 are integrally connected to a suitable trip handle 43, the assembly being journaled on the actuating pin 40. An adjustable stop screw 44 threadedly mounted at 45 in the stop block 46 suitably fixed to the brackets 41 of the frame of the unit provides means for limiting the counterclockwise movement of the link 39, FIG. 2, by the engagement of the end 48 of the screw 44 with the surface 49 of the actuating link 39. The adjusting blocks 42 have abutment surfaces 50 which engage the pin 38 when the trip handle 43 is pulled in a clockwise direction, FIG. 2.

When the blade rotor 20 is to be held against rotation during scraping and berm building operations, FIG. 2, the stop screw 44 is so adjusted that the axis 51 of the pin 38 is slightly below the plane 52 passing through the axis 53 of the pin 37 and the axis 54 of the actuating pin 40 so that the linkage system 36—39 is slightly over center to thus provide a positive block against counterclockwise movement of the rockshaft 29 and the blade stops 31—32—33, thus securely holding the blade rotor against movement by engagement of the abutment surfaces 35 against the moldboard surface 24 of the blade rotor 20.

In FIG. 3 is shown the condition where the trip handle 43 has been pulled to the right to swing the adjusting blocks 42 clockwise around the pin 40 to break the linkage 36—39 off of dead center. This allows the scraper blade edge 21 to engage the surfaces 54a of the blade stops 31—32—33 to swing the rockshaft 29 counterclockwise causing the links 36—39 to fold upwardly as shown.

Continued rotation of the blade rotor causes the blade edge 21 to rotate past the outer ends 55 of the blade stops 31—32—33 whereupon the rockshaft 29 can again rotate clockwise, swinging the blade stop back down to the position shown in FIG. 2, snapping the links 36—39 back to over center locked position, with link 39 engaging the stop screw 44 as shown. Thus, as the blade rotator continues to rotate its moldboard surface 25 comes into engagement with the abutment surfaces 35 of the blade stops 31—32—33, positioning the next blade 23 in scraping position, ready to scrape up the next berm to be developed.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A trip mechanism for a rotary multiple blade scraper having, a frame, a blade rotor freely journaled on said frame, means for mounting said frame on a tractor, a plurality of scraper blades separated by moldboard portions on said blade rotor adapted to engage and scrape a ground surface, said trip mechanism being adapted to releasing and arresting free rotation of said blade rotor and characterized by a rock shaft journaled on said frame, a plurality of axially spaced blade stops fixed to said rockshaft and extending radially outwardly thereof having abutment surfaces adapted to engage successive moldboard portions, a toggle lock and trip mechanism to hold said blade stops in stop position comprising, a link pivotally connected at one end to one of said blade stops and connected at its other end to the outer end of an actuating link which actuating link has its other end pivotally connected to an actuating pin journaled on said frame, a trip handle journaled on said actuating pin, an adjusting block fixed on said trip handle having an abutment surface adapted to engage the pivotal connection between said first mentioned link and said actuating link whereby movement of said trip handle moves said links from over-center position to move said blade stops to a position to allow free rotation of said blade rotor.

2. A trip mechanism as set forth in claim 1 wherein an adjustable stop is provided on said frame and adapted to engage said actuating link to limit the degree of over center position of said links.

References Cited in the file of this patent
UNITED STATES PATENTS

| | | |
|---|---|---|
| 1,539,207 | Ranker | May 26, 1925 |
| 2,029,680 | Shedd et al. | Feb. 4, 1936 |
| 2,278,349 | Fisher | Mar. 31, 1942 |
| 2,393,279 | Bennett | Jan. 22, 1946 |
| 2,618,168 | Onsrud | Nov. 18, 1952 |
| 2,622,501 | Bennett | Dec. 23, 1952 |